(12) United States Patent
Liu et al.

(10) Patent No.: US 10,887,855 B2
(45) Date of Patent: Jan. 5, 2021

(54) SYNCHRONIZATION PROCESSING METHOD AND APPARATUS, AND DEVICE

(71) Applicant: Huawei Technologies Co., Ltd., Guangdong (CN)

(72) Inventors: Jin Liu, Shenzhen (CN); Jun Luo, Shanghai (CN); Yinggang Du, Shenzhen (CN); Hongzhe Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/359,601

(22) Filed: Mar. 20, 2019

(65) Prior Publication Data

US 2019/0223126 A1    Jul. 18, 2019

Related U.S. Application Data

(63) Continuation of application No. PCT/CN2017/097641, filed on Aug. 16, 2017.

(30) Foreign Application Priority Data

Sep. 30, 2016    (CN) .......................... 2016 1 0873206

(51) Int. Cl.
*H04J 3/06*    (2006.01)
*H04W 56/00*    (2009.01)
(Continued)

(52) U.S. Cl.
CPC ......... *H04W 56/0015* (2013.01); *H04J 11/00* (2013.01); *H04L 1/06* (2013.01);
(Continued)

(58) Field of Classification Search
None
See application file for complete search history.

(56) References Cited

U.S. PATENT DOCUMENTS

| | | | |
|---|---|---|---|
| 2010/0118839 | A1 | 5/2010 | Malladi et al. |
| 2012/0063348 | A1 | 3/2012 | Guo |

(Continued)

FOREIGN PATENT DOCUMENTS

| | | | |
|---|---|---|---|
| CN | 101888644 | A | 11/2010 |
| CN | 104219757 | A | 12/2014 |

(Continued)

*Primary Examiner* — Phirin Sam
(74) *Attorney, Agent, or Firm* — Slater Matsil, LLP

(57) ABSTRACT

Embodiments of this application provide a synchronization processing method and apparatus, and a device. The method includes: sending, by a network device, a first synchronization signal and a second synchronization signal to a terminal device within a first time unit, where frequencies of first synchronization signals in all beams are the same, and each beam has a different difference between the frequency of the first synchronization signal and a frequency of the second synchronization signal; and determining, by the terminal device, an optimal transmit beam of the network device for the terminal device and a time sequence of the optimal transmit beam based on the first synchronization signal and the second synchronization signal. This method effectively reducing synchronization detection complexity of the terminal device.

20 Claims, 11 Drawing Sheets

(51) Int. Cl.
*H04W 74/08* (2009.01)
*H04W 72/04* (2009.01)
*H04L 1/06* (2006.01)
*H04J 11/00* (2006.01)
*H04W 16/28* (2009.01)

(52) U.S. Cl.
CPC ........... *H04W 16/28* (2013.01); *H04W 56/00* (2013.01); *H04W 72/04* (2013.01); *H04W 74/08* (2013.01)

(56) References Cited

U.S. PATENT DOCUMENTS

| | | |
|---|---|---|
| 2013/0272263 A1 | 10/2013 | Pi et al. |
| 2016/0142989 A1 | 5/2016 | Hashemi et al. |
| 2016/0337159 A1* | 11/2016 | Seo ..................... H04W 56/002 |
| 2016/0360463 A1* | 12/2016 | Kim ..................... H04W 36/30 |
| 2017/0048810 A1* | 2/2017 | Sahlin .................... H04L 5/0048 |
| 2017/0150461 A1 | 5/2017 | Li et al. |
| 2017/0201968 A1* | 7/2017 | Nam ........................ H04W 4/70 |
| 2018/0199309 A1* | 7/2018 | Islam .................. H04W 56/001 |

FOREIGN PATENT DOCUMENTS

| | | |
|---|---|---|
| CN | 104396151 A | 3/2015 |
| CN | 105897322 A | 8/2016 |
| EP | 2897305 A1 | 7/2015 |
| WO | 2015080646 A1 | 6/2015 |
| WO | 2015/195375 A1 | 12/2015 |
| WO | 2016/055102 A1 | 4/2016 |
| WO | 2016/073243 A1 | 5/2016 |

\* cited by examiner

SYNCHRONIZATION PROCESSING METHOD AND APPARATUS, AND DEVICE

CROSS-REFERENCE TO RELATED APPLICATIONS

This application is a continuation of International Application No. PCT/CN2017/097641, filed on Aug. 16, 2017, which claims priority to Chinese Patent Application No. 201610873206.4, filed on Sep. 30, 2016. The disclosures of the aforementioned applications are hereby incorporated by reference in their entireties.

TECHNICAL FIELD

Embodiments of this application relate to communications technologies, and in particular, to a synchronization processing method and apparatus, and a device.

BACKGROUND

Long Term Evolution Advanced (LTE-A), also referred to as 4G, has been widely deployed and used, and a user obtains a higher communication rate and better communication experience than those in a 3G communications system. Cell search and synchronization are key steps for establishing a connection between user equipment (UE) and a communications network in a mobile communications system, and are mainly to establish time-frequency synchronization between the UE and a base station of a cell in which the UE is located, so that the UE obtains a cell identity (ID), a system transmission parameter, and other cell broadcast information.

In an existing cell search and synchronization solution, a synchronization signal (SS) usually includes a primary synchronization signal (PSS) and a secondary synchronization signal (SSS. The PSS is usually used to enable UE to achieve symbol synchronization and a cell intra-group ID, and the SSS is usually used to achieve signal frame synchronization and a cell group ID. With research and development of a 5G communications system, a massive multiple-input multiple-output (MIMO) technology can effectively increase a system throughput rate. However, when the massive MIMO technology is used in combination with a millimeter wave, and a base station provides the cell search and synchronization for UE within a coverage area, huge system resource overheads are caused. Currently, a user access solution that uses a plurality of narrow beams for polling is proposed. The coverage area of the base station is divided into six sectors, each sector is divided into four slices, and each slice corresponds to a transmit beam direction of a base station signal. For each slice, the base station separately sends an SS and performs polling, and the SS of each slice occupies a symbol. For a user within the coverage area of the base station, a receive beam direction of the user is switched at an interval of one subframe (e.g., 1 ms). To ensure that all beams sent by the base station are received, the base station inserts a synchronization channel (SCH) signal similar to a cyclic prefix within each receive beam time (1 ms) of the user. For all subframes, directions of initial beams sent by the base station sequentially change. The UE performs correlation detection between a preset PSS sequence and a PSS sequence sent by the base station, to implement symbol synchronization.

However, relatively high detection complexity is caused during cell search and synchronization because a large quantity of SS sequences need to be used to enable the UE to distinguish between different beams in a user access process.

SUMMARY

Embodiments of this application provide a synchronization processing method and apparatus, and a device, to resolve a problem that relatively high detection complexity is caused during cell search and synchronization because a large quantity of SS sequences need to be used to enable UE to distinguish between different beams in a user access process.

A first aspect of this application provides a synchronization processing method, including:
sending, by a network device, a first synchronization signal and a second synchronization signal to a terminal device within a first time unit, so that the terminal device determines an optimal transmit beam of the network device for the terminal device and a time sequence of the optimal transmit beam based on the first synchronization signal and the second synchronization signal, where
frequencies of first synchronization signals in all beams are the same, each beam is corresponding to a different frequency offset, and the frequency offset is a difference between the frequency of the first synchronization signal in the beam and a frequency of the second synchronization signal in the beam.

In this solution, the network device may be a device on a network side, for example, a base station. The first synchronization signal and the second synchronization signal in each beam are simultaneously sent in time domain, and are multiplexed in frequency domain. To be specific, a same beam carries both the first synchronization signal and the second synchronization signal, and the terminal device at a receive end may distinguish between different beams based on the frequency offset between the two synchronization signals in the same beam. Sequences of beams in the foregoing synchronization signal may be the same or may be different. This is not specifically limited. In this solution, due to different frequency offsets between the two synchronization signals in beams, and the terminal device at the receive end needs to detect only the two synchronization signals to determine the optimal transmit beam of the network device for the terminal device and the time sequence of the optimal transmit beam, reducing interaction for determining the optimal transmit beam between the terminal device and the network device, and effectively reducing synchronization detection complexity of the terminal device.

Optionally, first synchronization signals in all beams use a same sequence.

Optionally, the second synchronization signal in all beams use a same sequence.

To further reduce detection complexity of the terminal device in a cell search and synchronization process, first synchronization signals in all the beams sent by the network device use the same sequence, and the second synchronization signal in all the beams may also use the same sequence.

Optionally, a sequence used by the first synchronization signal is different from a sequence used by the second synchronization signal.

Further, the method further includes:
sending, by the network device, a third synchronization signal and a fourth synchronization signal to the terminal device within a second time unit, so that the terminal device determines an optimal transmit beam of the network device for the terminal device and a time sequence of the optimal transmit beam based on the third synchronization signal and the fourth synchronization signal, where frequencies of third synchronization signals in all beams are the same, and each beam has a different difference between the frequency of the third synchronization signal and a frequency of the fourth synchronization signal.

To further improve an access speed of the terminal device, the network device may further send the third synchronization signal and the fourth synchronization signal within the second time unit after the first synchronization signal and the second synchronization signal are sent, so that the terminal device can continuously perform correlation detection based on the beam of the synchronization signal, and more quickly determine the optimal transmit beam of the network device for the terminal device and the time sequence of the optimal transmit beam. This effectively reduces synchronization detection complexity of the terminal device and shortens a detection time.

Optionally, the third synchronization signal in all beams use a same sequence.

Optionally, the fourth synchronization signal in all beams use a same sequence.

Optionally, a sequence used by the third synchronization signal is different from a sequence used by the fourth synchronization signal.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, based on any one of the foregoing solutions, the sequence used by the first synchronization signal may be exactly the same as the sequence used by the third synchronization signal.

A time sequence location of the optimal beam is determined based on the first synchronization signal, the second synchronization signal, the third synchronization signal, and the fourth synchronization signal, and a beam at another location may be determined, so that time sequences of uplink access channels may be in a one-to-one correspondence with time sequences of downlink access channels, reducing exchange of information about the beam between the terminal device and the network device.

Based on any one of the foregoing solutions, the method further includes: receiving, by the network device, a signal sent by the terminal device in the time sequence of the optimal transmit beam.

The optimal transmit beam of the network device for the terminal device is determined. Based on uplink-downlink reciprocity, the time sequence location of the optimal transmit beam is also an optimal location for sending an uplink beam by the terminal device, and therefore the terminal device may send an uplink signal to the network device in the time sequence of the optimal transmit beam.

A second aspect of this application provides a synchronization processing method, including:

receiving, by a terminal device, a first synchronization signal and a second synchronization signal that are sent by a network device within a first time unit, where frequencies of first synchronization signals in all beams are the same, each beam is corresponding to a different frequency offset, and the frequency offset is a difference between the frequency of the first synchronization signal in the beam and a frequency of the second synchronization signal in the beam; and determining, by the terminal device, an optimal transmit beam of the network device for the terminal device and a time sequence of the optimal transmit beam based on the first synchronization signal and the second synchronization signal.

In this solution, the terminal device receives the first synchronization signal and the second synchronization signal that are sent by the network device, and frequency offsets between the two synchronization signals in all the beams are different. The terminal device performs correlation detection between a received beam sequence and a pre-stored synchronization sequence, and determines a time sequence location of a most related beam based on time and frequency. To be specific, the terminal device determines the optimal transmit beam and the time sequence of the optimal transmit beam, and needs to detect only the two synchronization signals instead of a plurality of synchronization signals to obtain the optimal transmit beam, reducing exchange about a synchronization signal between the terminal device and the network device, and reducing detection complexity in a synchronization process.

Optionally, the terminal device performs correlation detection between each beam sequence used by the first synchronization signal and a pre-stored first synchronization sequence, performs correlation detection between each beam sequence used by the second synchronization signal and a pre-stored second synchronization sequence, and obtains an optimal beam of the first synchronization signal and an optimal beam of the second synchronization signal, where the optimal beam is a beam with correlation higher than a preset threshold and with highest correlation; and the terminal device obtains the optimal transmit beam of the network device for the terminal device and the time sequence of the optimal transmit beam based on a frequency difference between a frequency of the optimal beam of the first synchronization signal and a frequency of the optimal beam of the second synchronization signal.

Optionally, first synchronization signals in all beams use a same sequence.

Optionally, the second synchronization signal in all beams use a same sequence.

Optionally, a sequence used by the first synchronization signal is different from a sequence used by the second synchronization signal.

Based on any one of the foregoing solutions, the method further includes:

receiving, by the terminal device, a third synchronization signal and a fourth synchronization signal that are sent by the network device within a second time unit, where frequencies of third synchronization signals in all beams are the same, and each beam has a different difference between the frequency of the third synchronization signal and a frequency of the fourth synchronization signal; and the method further includes:

determining, by the terminal device, an optimal transmit beam of the network device for the terminal device and a time sequence of the optimal transmit beam based on the third synchronization signal and the fourth synchronization signal.

To further improve an access speed of the terminal device, the network device may further send the third synchronization signal and the fourth synchronization signal within the second time unit after the first synchronization signal and the second synchronization signal are sent, so that the terminal device can continuously perform correlation detection based on the beam of the synchronization signal. To be specific, the terminal device may more quickly determine the optimal transmit beam of the network device for the terminal device and the time sequence of the optimal transmit beam based on the first synchronization signal and the second synchronization signal, or based on the third synchronization signal and the fourth synchronization signal, effectively reducing synchronization detection complexity of the terminal device and shortening a detection time.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Based on any one of the foregoing solutions, the method further includes: initiating, by the terminal device, random access based on a time sequence correspondence between the optimal transmit beam and a random access channel.

Optionally, the method further includes: sending, by the terminal device, a signal to the network device in the time sequence of the optimal transmit beam.

The optimal transmit beam of the network device for the terminal device is determined. Based on uplink-downlink reciprocity, the time sequence location of the optimal transmit beam is also an optimal location for sending an uplink beam by the terminal device, and therefore the terminal device may send an uplink signal to the network device in the time sequence of the optimal transmit beam.

A third aspect of this application provides a synchronization processing apparatus, including:

a storage module, configured to: store a correspondence between a beam and a frequency offset, and store a corresponding program;

a processing module, configured to generate a first synchronization signal and a second synchronization signal; and a sending module, configured to send the first synchronization signal and the second synchronization signal to a terminal device within a first time unit, so that the terminal device determines an optimal transmit beam of the synchronization processing apparatus for the terminal device and a time sequence of the optimal transmit beam based on the first synchronization signal and the second synchronization signal, where frequencies of first synchronization signals in all beams are the same, each beam is corresponding to a different frequency offset, and the frequency offset is a difference between the frequency of the first synchronization signal in the beam and a frequency of the second synchronization signal in the beam.

Optionally, first synchronization signals in all beams use a same sequence.

Optionally, the second synchronization signal in all beams use a same sequence.

Optionally, the sending module is further configured to send a third synchronization signal and a fourth synchronization signal to the terminal device within a second time unit, so that the terminal device determines an optimal transmit beam of the synchronization processing apparatus for the terminal device and a time sequence of the optimal transmit beam based on the third synchronization signal and the fourth synchronization signal, where sending frequencies of third synchronization signals in all beams are the same, and each beam has a different difference between the frequency of the third synchronization signal and a frequency of the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, the apparatus further includes:

a receiving module, configured to receive a signal sent by the terminal device in the time sequence of the optimal transmit beam.

A fourth aspect of this application provides a synchronization processing apparatus, including:

a storage module, configured to: store a correspondence between a beam and a frequency offset, and store a corresponding program;

a receiving module, configured to receive a first synchronization signal and a second synchronization signal that are sent by a network device within a first time unit, where frequencies of first synchronization signals in all beams are the same, each beam is corresponding to a different frequency offset, and the frequency offset is a difference between the frequency of the first synchronization signal in the beam and a frequency of the second synchronization signal in the beam; and a processing module, configured to determine an optimal transmit beam of the network device for the synchronization processing apparatus and a time sequence of the optimal transmit beam based on the first synchronization signal and the second synchronization signal.

Optionally, the processing module is specifically configured to:

perform correlation detection between each beam sequence used by the first synchronization signal and a first synchronization sequence, perform correlation detection between each beam sequence used by the second synchronization signal and a second synchronization sequence, and obtain an optimal beam of the first synchronization signal and an optimal beam of the second synchronization signal, where the optimal beam is a beam with correlation higher than a preset threshold and with highest correlation; and obtain the optimal transmit beam of the network device for the synchronization processing apparatus and the time sequence of the optimal transmit beam based on a frequency difference between a frequency of the optimal beam of the first synchronization signal and a frequency of the optimal beam of the second synchronization signal.

Optionally, the first synchronization sequence and the second synchronization sequence are stored in the storage module or generated by the processing module.

Optionally, first synchronization signals in all beams use a same sequence.

Optionally, the second synchronization signal in all beams use a same sequence.

Optionally, the receiving module is further configured to receive a third synchronization signal and a fourth synchronization signal that are sent by the network device within a second time unit, where frequencies of third synchronization signals in all beams are the same, and each beam has a different difference between the frequency of the third synchronization signal and a frequency of the fourth synchronization signal; and the processing module is further configured to determine an optimal transmit beam of the network device for the synchronization processing apparatus and a time sequence of the optimal transmit beam based on the third synchronization signal and the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, the processing module is further configured to initiate random access based on a time sequence correspondence between the optimal transmit beam and a random access channel.

Optionally, the apparatus further includes:

a sending module, configured to send a signal to the network device in the time sequence of the optimal transmit beam.

A fifth aspect of this application provides a network device, including:

a memory, configured to: store a correspondence between a beam and a frequency offset, and store a corresponding program;

a processor, configured to generate a first synchronization signal and a second synchronization signal; and a transmitter, configured to send the first synchronization signal and the second synchronization signal to a terminal device within a first time unit, so that the terminal device determines an optimal transmit beam of the network device for the terminal device and a time sequence of the optimal transmit beam based on the first synchronization signal and the second synchronization signal, where frequencies of first synchronization signals in all beams are the same, each beam is corresponding to a different frequency offset, and the frequency offset is a difference between the frequency of the first synchronization signal in the beam and a frequency of the second synchronization signal in the beam.

Optionally, first synchronization signals in all beams use a same sequence.

Optionally, the second synchronization signal in all beams use a same sequence.

Optionally, the transmitter is further configured to send a third synchronization signal and a fourth synchronization signal to the terminal device within a second time unit, so that the terminal device determines an optimal transmit beam of the network device for the terminal device and a time sequence of the optimal transmit beam based on the third synchronization signal and the fourth synchronization signal, where frequencies of third synchronization signals in all beams are the same, and each beam has a different difference between the frequency of the third synchronization signal and a frequency of the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, the network device further includes:

a receiver, configured to receive a signal sent by the terminal device in the time sequence of the optimal transmit beam.

A sixth aspect of this application provides a terminal device, including:

a memory, configured to: store a correspondence between a beam and a frequency offset, and store a corresponding program;

a receiver, configured to receive a first synchronization signal and a second synchronization signal that are sent by a network device within a first time unit, where frequencies of first synchronization signals in all beams are the same, each beam is corresponding to a different frequency offset, and the frequency offset is a difference between the frequency of the first synchronization signal in the beam and a frequency of the second synchronization signal in the beam; and a processor, configured to determine an optimal transmit beam of the network device for the terminal device and a time sequence of the optimal transmit beam based on the first synchronization signal and the second synchronization signal.

Optionally, the processor is specifically configured to:

perform correlation detection between each beam sequence used by the first synchronization signal and a first synchronization sequence, perform correlation detection between each beam sequence used by the second synchronization signal and a second synchronization sequence, and obtain an optimal beam of the first synchronization signal and an optimal beam of the second synchronization signal, where the optimal beam is a beam with correlation higher than a preset threshold and with highest correlation; and obtain the optimal transmit beam used for the user equipment by the network device and the time sequence of the optimal transmit beam based on a frequency difference between a frequency of the optimal beam of the first synchronization signal and a frequency of the optimal beam of the second synchronization signal.

Optionally, the first synchronization sequence and the second synchronization sequence are stored in the memory or generated by the processor.

Optionally, first synchronization signals in all beams use a same sequence.

Optionally, the second synchronization signal in all beams use a same sequence.

Optionally, the receiver is further configured to receive a third synchronization signal and a fourth synchronization signal that are sent by the network device within a second time unit, where frequencies of third synchronization signals in all beams are the same, and each beam has a different difference between the frequency of the third synchronization signal and a frequency of the fourth synchronization signal; and the processor is further configured to determine an optimal transmit beam used for the user equipment by the network device and a time sequence of the optimal transmit beam based on the third synchronization signal and the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, the processor is further configured to initiate random access based on a time sequence correspondence between the optimal transmit beam and a random access channel.

Optionally, the user equipment further includes:

a transmitter, configured to send a signal to the network device in the time sequence of the optimal transmit beam.

A seventh aspect of this application provides a storage medium, including a readable storage medium and a computer program, where the computer program is used to implement the synchronization processing method provided in the first aspect.

An eighth aspect of this application provides a storage medium, including a readable storage medium and a computer program, where the computer program is used to implement the synchronization processing method provided in the second aspect.

A ninth aspect of this application provides a program product, including a computer program, where the computer program is stored in a readable storage medium, and at least one processor of a network device reads the computer program from the readable storage medium and executes the computer program, so that the network device performs the synchronization processing method provided in any implementation of the first aspect.

A tenth aspect of this application provides a program product, including a computer program, where the computer program is stored in a readable storage medium, and at least one processor of a terminal device reads the computer program from the readable storage medium and executes the computer program, so that the terminal device performs the synchronization processing method provided in any implementation of the second aspect.

According to the synchronization processing method and apparatus, and the device provided in this application, the network device sends the first synchronization signal and the second synchronization signal to the terminal device within the first time unit, the frequencies of the first synchronization signals in all beams are the same, and each beam has a different difference between the frequency of the first synchronization signal and a frequency of the second synchronization signal. The terminal device determines the optimal transmit beam of the network device for the terminal device and the time sequence of the optimal transmit beam based on the first synchronization signal and the second synchronization signal. By using the two synchronization signals with transmit beams having different frequency offsets, the terminal device at the receive end needs to detect only the two synchronization signals to determine the optimal transmit beam of the network device for the terminal device and the time sequence of the optimal transmit beam, reducing interaction for determining the optimal transmit beam between the terminal device and the network device, and effectively reducing synchronization detection complexity of the terminal device.

DESCRIPTION OF EMBODIMENTS

A terminal device needs to detect signals of a plurality of subframes in a process of determining a time sequence of an optimal transmit beam of a network device for the terminal device and performing synchronization processing; consequently, signaling exchange is relatively frequent, and detection complexity is high. To resolve the problems, this application provides a new user access solution. In this case, a network device needs to send only two synchronization signals that have a specific rule, and a user-side terminal device may determine an optimal beam based on the two synchronization signals, to reduce detection complexity of a user in a cell search and synchronization process.

Figure 1A:
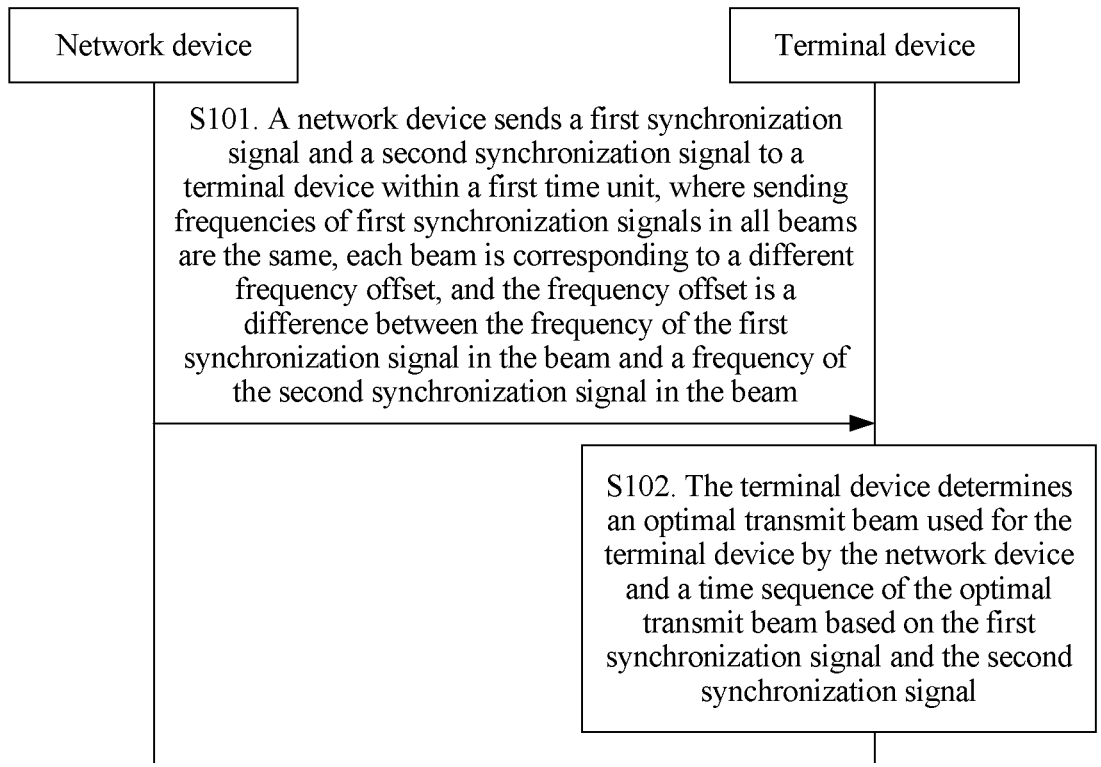
FIG. 1a is a flowchart of Embodiment 1 of a synchronization processing method in this application.

FIG. 1a is a flowchart of Embodiment 1 of a synchronization processing method in this application. As shown in FIG. 1a, specific implementation steps of the synchronization processing method are as follows.

S101. A network device sends a first synchronization signal and a second synchronization signal to a terminal device within a first time unit, where sending frequencies of first synchronization signals in all beams are the same, each beam is corresponding to a different frequency offset, and the frequency offset is a difference between the frequency of the first synchronization signal in the beam and a frequency of the second synchronization signal in the beam.

In this step, the network device is a base station on a network side or another device that can provide a base station function. The terminal device is a device that needs to exchange uplink and downlink data on a user side, for example, a mobile phone or a tablet computer. In particular, in device-to-device (D2D) communication, the network device may also be a terminal that functions as a base station.

The network device needs to generate two synchronization signals, and frequency offsets between two synchronization signals are different in all beams. For example, a first synchronization signal and a second synchronization signal in a first beam are at a same location in time domain and are multiplexed in frequency domain. To be specific, there is a frequency offset f1 between the first synchronization signal and the second synchronization signal in the first beam. Time sequence locations of a first synchronization signal and a second synchronization signal in a second beam are the same, and an offset in frequency domain is f2. Time sequence locations of a first synchronization signal and a second synchronization signal in a third beam are the same, an offset in frequency domain is f3, and f1, f2, and f3 herein are pairwise different. When sending the first synchronization signal and the second synchronization signal to the terminal device, the network device may send the first synchronization signal and the second synchronization signal at different frequency locations in a same signal frame. To reduce detection complexity of the terminal device at a receive end, optionally, carrier frequencies of first synchronization signals in all beams are the same, in other words, first synchronization signals in all beams are sent at a same frequency.

S102. The terminal device determines an optimal transmit beam of the network device for the terminal device and a time sequence of the optimal transmit beam based on the first synchronization signal and the second synchronization signal.

In this step, the terminal device receives the first synchronization signal and the second synchronization signal that are sent by the network device within the first time unit. Because the frequency offsets corresponding to all the beams are different, the terminal device performs correlation detection on a synchronization signal in each beam with reference to a synchronization sequence generated on line or pre-stored, can locate time sequences for different beams based on a frequency offset of each beam between the first synchronization signal and the second synchronization signal, and determines, with reference to a result of the correlation detection, a most related beam, to be specific, the optimal transmit beam of the network device for the terminal device and the time sequence of the optimal transmit beam. Certainly, a correlation value of the optimal beam also needs to be greater than a threshold. In particular, the following setting may be further performed. It may be considered that the optimal beam has been found without traversing all beams, provided that a correlation value of the beam is greater than a preset optimal threshold. Apparently, this optimal threshold is necessarily greater than the foregoing threshold. Herein, the foregoing are only two examples of determining an optimal beam, and a specific algorithm for determining an optimal beam is not limited herein.

Further, the terminal device initiates random access based on a time sequence correspondence between the optimal transmit beam and a random access channel, to implement access and synchronization of the terminal device.

Optionally, after determining the optimal transmit beam of the network device for the terminal device, the terminal device may determine, based on uplink-downlink reciprocity, the time sequence of the optimal transmit beam is also an optimal transmit beam for sending an uplink signal by the terminal device, and therefore the terminal device may send a signal to the network device in the time sequence of the optimal transmit beam.

According to the synchronization processing method provided in this embodiment, the network device uses two synchronization signals with transmit beams having different frequency offsets, so that the terminal device at the receive end needs to detect only the two synchronization signals to determine the optimal transmit beam of the network device for the terminal device and the time sequence of the optimal transmit beam, reducing interaction for determining the optimal transmit beam between the terminal device and the network device, and effectively reducing synchronization detection complexity of the terminal device.

Figure 1B:
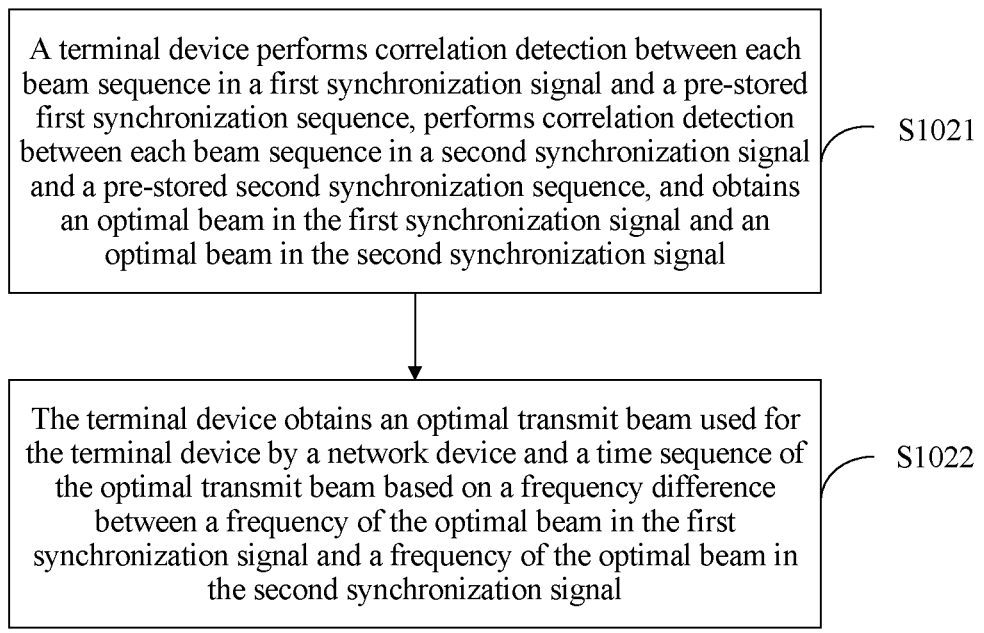
FIG. 1b is a flowchart of Embodiment 2 of a synchronization processing method in this application.

FIG. 1b is a flowchart of Embodiment 2 of a synchronization processing method in this application. As shown in FIG. 1b, in specific implementation of the embodiment shown in FIG. 1a, specific implementation steps of step S102 in which the terminal device determines the optimal transmit beam of the network device for the terminal device and the time sequence of the optimal transmit beam based on the first synchronization signal and the second synchronization signal are as follows.

S1021. The terminal device performs correlation detection between each beam sequence used by the first synchronization signal and a first synchronization sequence generated on line or pre-stored, performs correlation detection between each beam sequence used by the second synchronization signal and a second synchronization sequence generated on line or pre-stored, and obtains an optimal beam of the first synchronization signal and an optimal beam of the second synchronization signal.

In this step, the optimal beam is a beam with correlation higher than a preset threshold and with highest correlation. In a process of receiving each synchronization signal, the terminal device sequentially performs correlation detection between a sequence corresponding to different beams in each synchronization signal and a corresponding synchronization sequence, and finds a beam in a beam sequence with optimal correlation higher than a predetermined threshold in the synchronization signal, namely, the optimal beam.

S1022. The terminal device obtains the optimal transmit beam of the network device for the terminal device and the time sequence of the optimal transmit beam based on a frequency difference between a frequency of the optimal beam of the first synchronization signal and a frequency of the optimal beam of the second synchronization signal.

In this step, the terminal device determines the frequency difference between the optimal beam of the first synchronization signal and the optimal beam of the second synchronization signal. To be specific, the terminal device determines a time sequence location of the optimal transmit beam of the network device for the terminal device based on the frequency difference of each beam between the two synchronization signals, and may simultaneously obtain an identifier of the optimal transmit beam, to implement symbol locating.

Optionally, first synchronization signals in all beams use a same sequence.

Further, the second synchronization signal in all beams use a same sequence.

This means that in the foregoing two embodiments, to further reduce detection complexity of the terminal device in a cell search and synchronization process, first synchronization signals in all the beams sent by the network device use the same sequence, and the second synchronization signal in all the beams may also use the same sequence. In other words, first synchronization signals in all the beams use the same sequence, and the second synchronization signal in all the beams use the same sequence.

Figure 2:
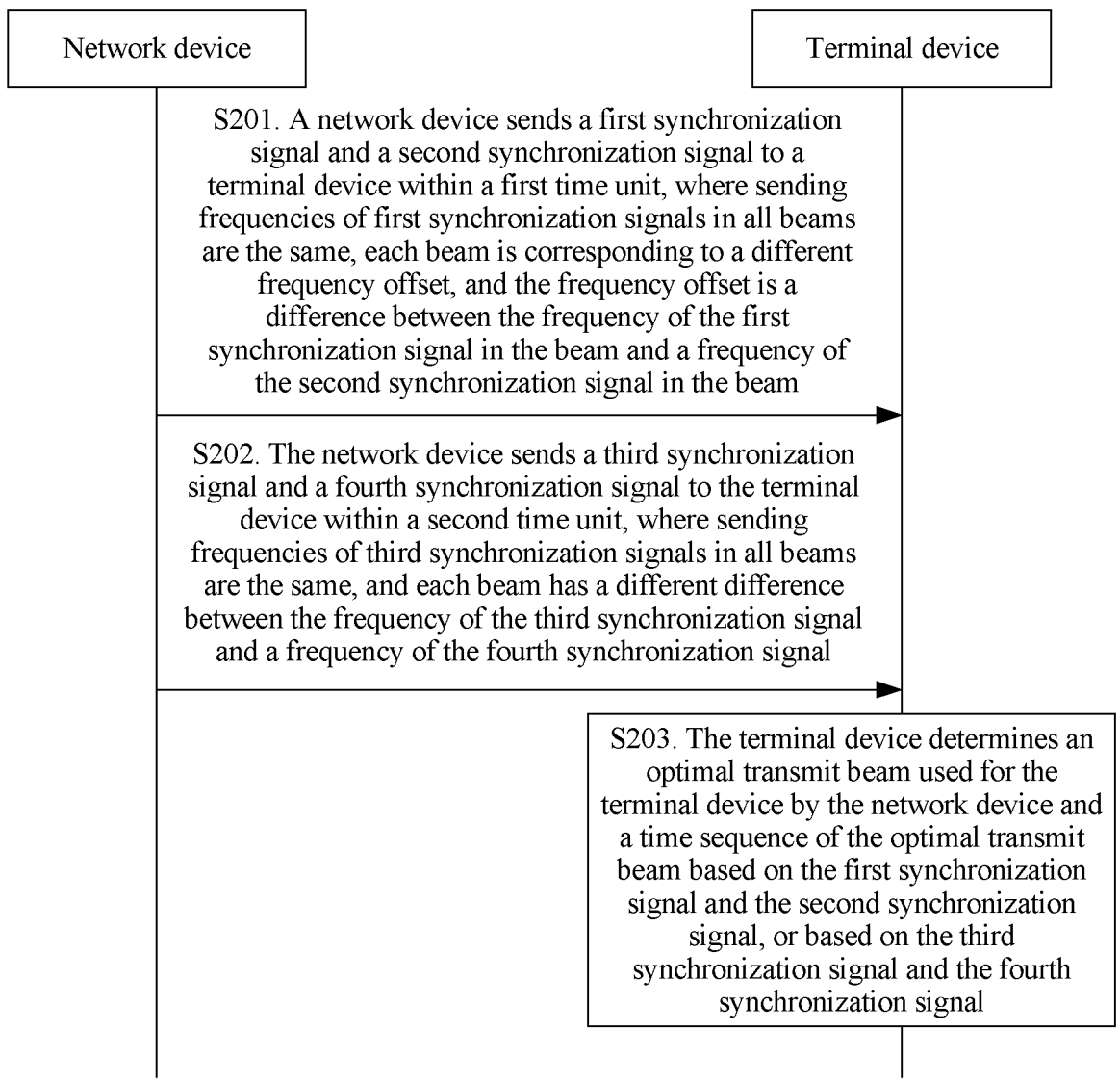
FIG. 2 is a flowchart of Embodiment 3 of a synchronization processing method in this application.

FIG. 2 is a flowchart of Embodiment 3 of a synchronization processing method in this application. As shown in FIG. 2, based on Embodiment 1, to further shorten an access time of a terminal device at a receive end, after sending a first synchronization signal and a second synchronization signal, a network device may send a third synchronization signal and a fourth synchronization signal within a second time unit, so that the terminal device can locate an optimal beam. Specific implementation steps of the synchronization processing method provided in this embodiment are as follows.

S201. The network device sends a first synchronization signal and a second synchronization signal to the terminal device within a first time unit, where sending frequencies of first synchronization signals in all beams are the same, each beam is corresponding to a different frequency offset, and the frequency offset is a difference between the frequency of the first synchronization signal in the beam and a frequency of the second synchronization signal in the beam.

An implementation of this step is the same as that of step S101 in Embodiment 1.

S202. The network device sends a third synchronization signal and a fourth synchronization signal to the terminal device within a second time unit, where sending frequencies of third synchronization signals in all beams are the same, and each beam has a different difference between the frequency of the third synchronization signal and a frequency of the fourth synchronization signal.

Similar to the first synchronization signal and the second synchronization signal in the foregoing embodiment, the third synchronization signal and the fourth synchronization signal that are sent by the network device within the second time unit are also multiplexed in frequency domain.

The third synchronization signal and the fourth synchronization signal are simultaneously sent in time domain. To reduce detection complexity of the terminal device at the receive end, all beams that carry third synchronization signals may be sent at a same selected frequency, and all beams that carry fourth synchronization signals may be sent at different frequencies, to ensure that frequency offsets between the third synchronization signal and the fourth synchronization signal are different for all the beams.

Optionally, the third synchronization signal in all beams use a same sequence.

Optionally, the fourth synchronization signal in all beams use a same sequence.

S203. The terminal device determines an optimal transmit beam of the network device for the terminal device and a time sequence of the optimal transmit beam based on the first synchronization signal and the second synchronization signal, or based on the third synchronization signal and the fourth synchronization signal.

In a process of receiving each synchronization signal, the terminal device sequentially performs correlation detection between a sequence corresponding to different beams in each synchronization signal and a corresponding synchronization sequence, and finds a beam in a beam sequence with optimal correlation in the synchronization signal, namely, the optimal beam.

The time sequence is located for the optimal beam based on the frequency offset of each beam between the first synchronization signal and the second synchronization signal, or based on the frequency offset of each beam between the third synchronization signal and the fourth synchronization signal, to obtain the optimal transmit beam and the time sequence of the optimal transmit beam.

In this solution, optionally, when the second synchronization signal in all beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Further, the terminal device initiates random access based on a time sequence correspondence between the optimal transmit beam and a random access channel, to implement access and synchronization of the terminal device.

Optionally, after determining the optimal transmit beam of the network device for the terminal device, the terminal device may determine, based on uplink-downlink reciprocity, thin the time sequence of the optimal transmit beam is also an optimal transmit beam for sending for sending an uplink signal by the terminal device, and therefore the terminal device may send a signal to the network device in the time sequence of the optimal transmit beam.

With reference to any one of the foregoing embodiments, the synchronization processing method provided in this application is described in detail below by using an example in which the network device is a base station, the first synchronization signal is a PSS, and the second synchronization signal is an SSS.

This solution provides a user access solution used for a high-frequency system. In a downlink signal frame (10 ms), a base station sends a PSS and an SSS within a same time unit, and the PSS and the SSS are multiplexed in frequency domain. Sequences used by all beams in the PSS are the same, and optionally, sequences used by all beams in the SSS are also the same, reducing detection complexity of UE in a cell search and synchronization process. The UE may perform symbol timing (symbol timing) based on an offset between the PSS and the SSS in the received beam in frequency domain, namely, a frequency difference, to obtain a time sequence location of an optimal transmit beam. Further, time sequences of uplink access channels are in a one-to-one correspondence with time sequences of downlink access channels, reducing exchange of information about beam synchronization between the UE and the base station.

Figure 3A:
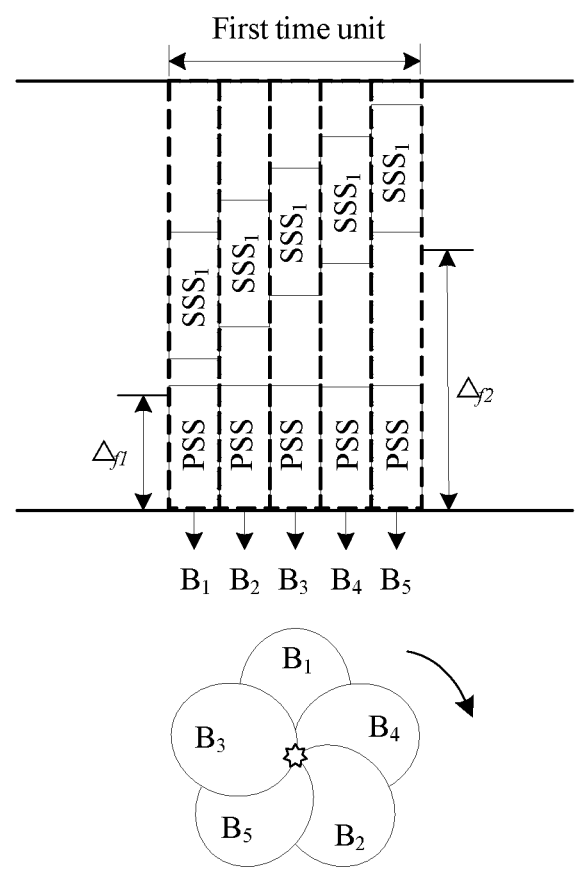
FIG. 3a is a schematic diagram of designing a synchronization signal frame provided in this application.

FIG. 3a is a schematic diagram of designing a synchronization signal frame provided in this application. As shown in FIG. 3a, a network device sends a PSS and an $SSS_1$ within a first time unit, all beam sequences in the PSS are the same (PSS), sequences used by all beams in the $SSS_1$ are the same ($SSS_1$), a $beam_1$ ($B_1$), a $beam_2$ ($B_2$), a $beam_3$ ($B_3$), a $beam_4$ ($B_4$), and a beams ($B_5$) in the figure represent identifiers of different beams, the PSS represents a sequence of a beam in a first synchronization signal, and the $SSS_1$ represents a sequence of a beam in a second synchronization signal. As shown in the figure, all sequences in the first synchronization signal are the same, and all sequences in the second synchronization signal are the same. $\Delta f1$ represents a frequency offset of the $beam_1$ ($B_1$) between the first synchronization signal and the second synchronization signal, and $\Delta f5$ represents a frequency offset of the beams ($B_5$) between the first synchronization signal and the second synchronization signal.

For different slices (namely, the foregoing different beams) of each subframe signal, different sequences are used in the two synchronization signals sent by a base station, and there is a frequency offset of each beam between the PSS and the $SSS_1$. A terminal device at a receive end may perform receiving processing based on the PSS and the $SSS_1$ that are sent by the base station in a same signal frame (the first time unit), and each UE detects a synchronization signal by switching a receive beam. An access time of the UE is not limited, because within a time interval of one receive beam, the UE may receive all beams sent by the base station in one signal frame. For different beams in each subframe, the UE performs correlation detection between a received sequence and a synchronization sequence generated on line or pre-stored, and finds a beam corresponding to an optimal result of the sequence correlation detection in the subframe. The UE determines, based on a frequency difference of the beam found in the two synchronization signals, a time sequence location corresponding to an optimal transmit beam of the base station, and simultaneously obtains an identifier of the optimal transmit beam of the base station, in other words, implements symbol timing.

As described above, the UE may obtain an optimal transmit beam direction of the base station by receiving a downlink synchronization signal, and the UE may send an uplink beam in the optimal transmit beam direction of the base station based on uplink-downlink reciprocity. In the example shown in FIG. 3a, the UE may perform detection by using a plurality of downlink synchronization signal frames, switches a receive beam direction of the UE for each signal frame, and compares a sequence correlation detection result in each signal frame, and a receive beam direction, corresponding to an optimal detection result, of the UE is an optimal receive beam direction of the UE.

Different UEs may receive different first beams at first. However, provided that all beams of one synchronization signal are received, the foregoing processing can be performed to obtain the optimal transmit beam.

The foregoing shows a case in which all sequences in a same synchronization signal are the same. In specific implementation, all sequences in the synchronization signal are not limited to being the same, and the sequences may alternatively be different.

In this implementation solution, the terminal device may complete frame timing by using the PSS and the SSS within the foregoing time unit, for example, in a frame structure similar to that in LTE-A, namely, 10 ms timing. Without loss of generality, a frame length of 10 ms is used as an example in this application.

Figure 3B:
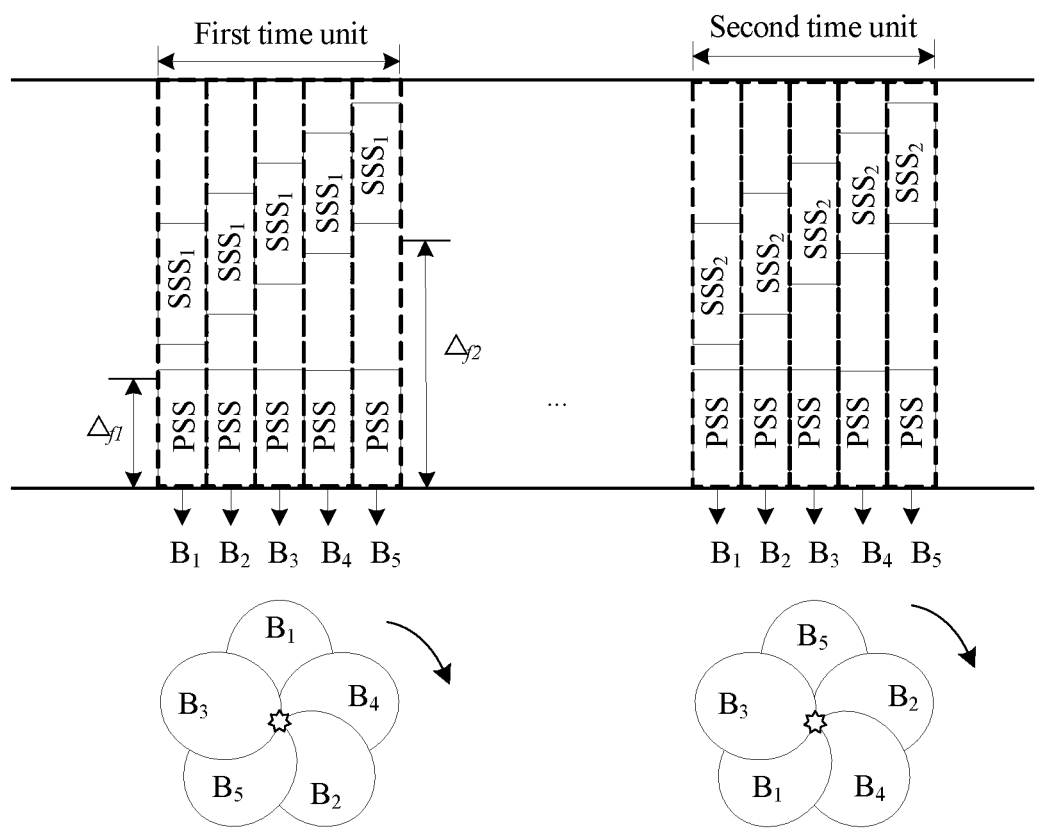
FIG. 3b is a schematic diagram of designing another synchronization signal frame provided in this application.

FIG. 3b is a schematic diagram of designing another synchronization signal frame provided in this application. As shown in FIG. 3b, after two synchronization signals are sent within a first time unit shown in FIG. 3a, two other synchronization signals, namely, the third synchronization signal and fourth synchronization signal may be sent within a second time unit. Usually, the first time unit is in a first half frame, and the second time unit is in a second half frame. As shown in the figure, within the second time unit, a PSS and an $SSS_2$ that are the same as those sent in a first subframe are sent in a second subframe. In this solution, beam sequences in the $SSS_2$ are the same, different sequences are used in the two synchronization signals sent by a base station within the second time unit, and there is a frequency offset of each beam between the PSS and the $SSS_2$. A terminal device at a receive end may perform receiving processing based on the PSS and the $SSS_2$ that are sent by the base station in a same signal frame (the second time unit), and each UE detects a synchronization signal by switching a receive beam. An access time of the UE is not limited, because the UE may receive, within a time interval of one receive beam, all beams sent by the base station in one signal frame.

As shown in FIG. 3b, one group of PSSs are sent in a particular subframe, another group of PSSs are sent in another subframe, the two groups of PSSs in the two subframes are the same, and half-frame timing (namely, 5 ms timing) is achieved by using the PSS. Frame timing (namely, 10 ms timing) and a cell identity are obtained by sending two different groups of SSSs (namely, an $SSS_1$ and the $SSS_2$) in the two subframes. Different symbols are determined by using different subcarrier offsets or frequency offsets (frequency offset) $\Delta_{fl}$ between the SSS(i) (i=1, 2) and the PSS, where l is a symbol sequence number and is corresponding to a beam sequence number.

Time-frequency synchronization, half-frame timing, frame timing, and symbol timing may be achieved by detecting a group of PSSs/SSSs, to implement fast access. Because a subcarrier spacing between the PSS and the SSS may be used to send other data or control information, there are no additional resource overheads.

In specific implementation of the foregoing solution, PSS sequences used in the two subframes may be exactly the same, and all or some SSS sequences used by all beams may be exactly the same, or all SSS sequences used by all beams may be different. Alternatively, all SSS sequences may be exactly the same, and all or some of PSS sequences used by all beams may be exactly the same, or all of PSS sequences used by all beams may be different.

Figure 4:
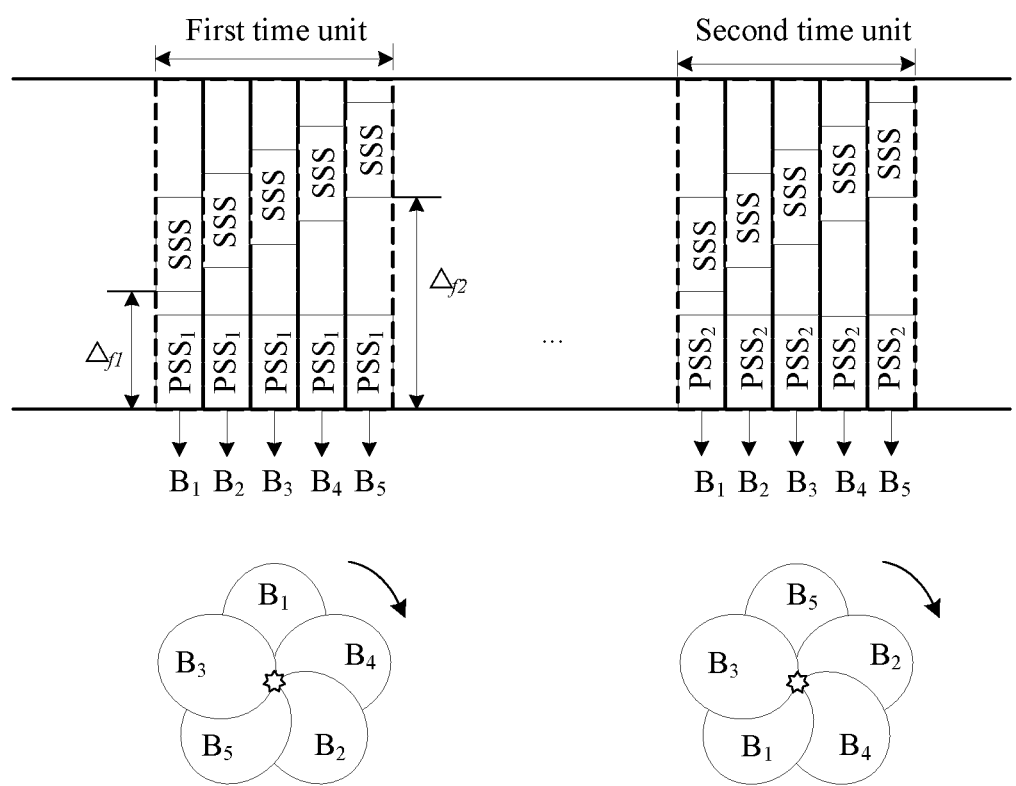
FIG. 4 is a schematic diagram of designing still another synchronization signal frame provided in this application.

FIG. 4 is a schematic diagram of designing still another synchronization signal frame provided in this application. As shown in FIG. 4, a group of $PSS_1$s and a group of SSSs are sent in a subframe, and another group of $PSS_2$s and a group of SSSs are sent in another subframe. The two groups of PSSs in the two subframes are different, and half-frame timing (namely, 5 ms timing) and frame timing (namely, 10 ms timing) are simultaneously achieved by using a PSS. A cell identity is obtained by sending two identical groups of SSSs in the two subframes. Different symbols are determined by using different subcarrier offsets or frequency offsets (frequency offset) $\Delta_{fl}$ between the SSS and the PSS(i) (i=1, 2), where l is a symbol sequence number.

In this example, a PSS sent by a base station within a first time unit and a PSS sent by the base station within a second time unit use different sequences, and an SSS sent by the base station within the first time unit and an SSS sent by the base station within the second time unit use a same sequence. A terminal device at a receive end performs correlation detection between a sequence of a received beam and a synchronization sequence generated on line or pre-stored, obtains an optimal transmit beam of the base station for the terminal device, and determines a time sequence location of the optimal beam based on a subcarrier offset, to obtain the optimal transmit beam and the time sequence of the optimal transmit beam.

Figure 5:
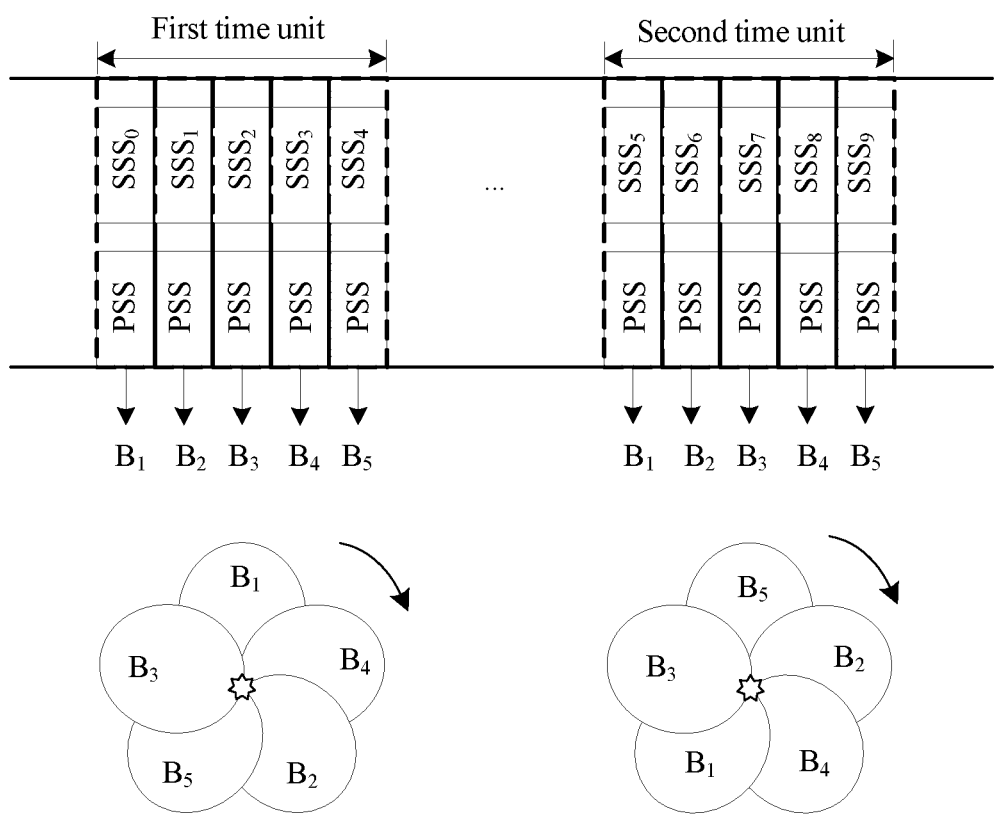
FIG. 5 is a schematic diagram of designing yet another synchronization signal frame provided in this application.

FIG. 5 is a schematic diagram of designing yet another synchronization signal frame provided in this application. As shown in FIG. 5, in this solution, sequences used by all beams in an SSS are different. A group of PSSs and a group of SSSs are sent in a subframe, another group of PSSs and another group of SSSs are sent in another subframe. The two groups of PSSs in the two subframes are the same, and half-frame timing (namely, 5 ms timing) is achieved by using a PSS. Sequences of the two groups of SSSs sent in the two subframes are different, and in this manner, frame timing (namely, 10 ms timing), symbol timing, and a cell identity may be achieved. For example, an $SSS_0$ to an $SSS_4$ and an $SSS_5$ to an $SSS_9$ all correspond to a same cell identity, the $SSS_0$ to the $SSS_4$ correspond to five symbols of a first subframe, and the $SSS_5$ to the $SSS_9$ correspond to five symbols of a second subframe.

Compared with the prior art, in this solution, frame timing, symbol timing, and the cell identity are distinguished by using different sequences of the SSS; in this way, neither resource overheads nor detection complexity is increased.

Figure 6:
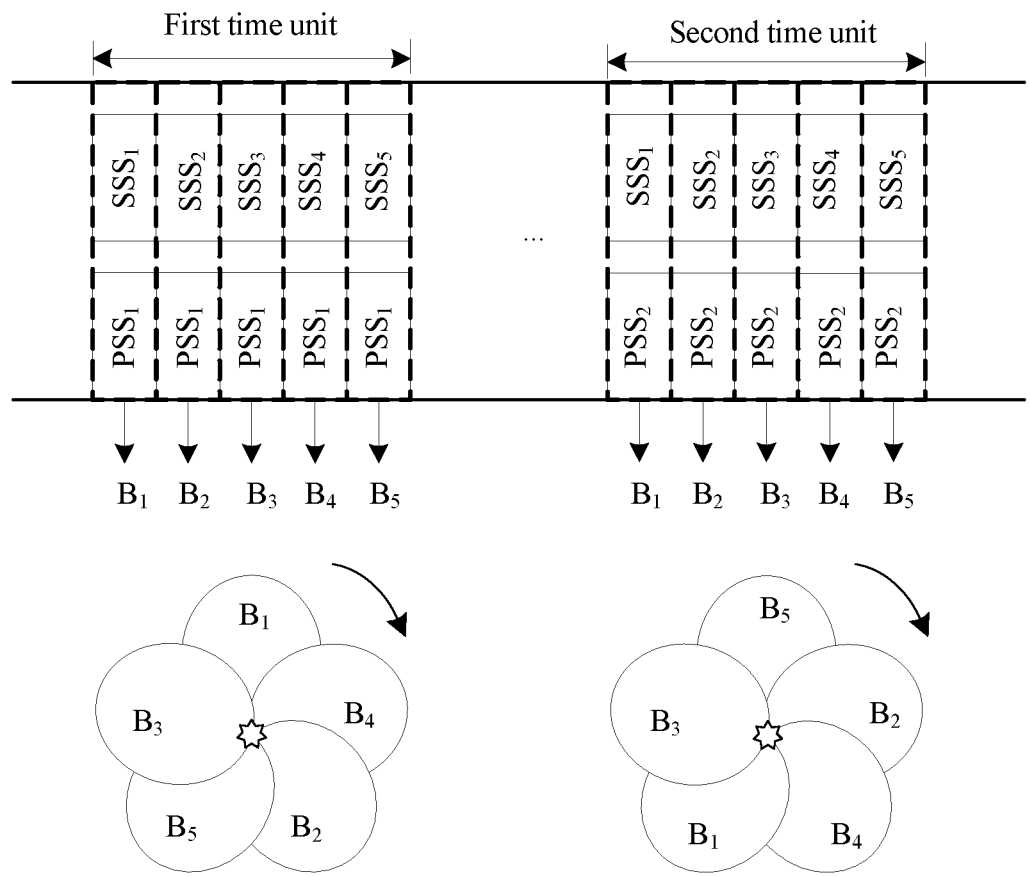
FIG. 6 is a schematic diagram of designing still yet another synchronization signal frame provided in this application.

FIG. 6 is a schematic diagram of designing still yet another synchronization signal frame provided in this application. As shown in FIG. 6, a group of PSSs are sent in a subframe, another group of PSSs is sent in another subframe, and sequences of the two groups of PSSs in the two subframes are different. Half-frame timing (namely, 5 ms timing) and frame timing (namely, 10 ms timing) are simultaneously achieved by using a PSS. Symbol timing and a cell identity are achieved by sending sequences of two identical groups of SSSs in the two subframes. For example, an $SSS_1$ to an $SSS_5$ correspond to a same cell identity, and the $SSS_1$ to the $SSS_5$ correspond to five symbols of each subframe that carries a synchronization signal.

Compared with the prior art, in this embodiment, symbol timing and the cell identity are achieved only by using different sequences of the SSS; in this way, neither resource overheads nor detection complexity is increased. Compared with the method shown in FIG. 5, in this embodiment, a quantity of SSS sequences used to identify different symbols is reduced by half; a quantity of supported SSS sequences used to identify a cell is increased.

In the foregoing specific implementations shown in FIG. 3b to FIG. 6, a solution in which the PSS and the SSS are sent in two time units is used as an example. In specific implementation, the terminal device only needs to locate a symbol in time domain based on a PSS and an SSS that are multiplexed in frequency domain and that are received within one time unit and based on a frequency offset between the PSS and the SSS or sequences in the PSS and the SSS in each beam. To be specific, frame timing can be implemented in the foregoing solution, and there is no need to send/receive a plurality of groups of synchronization signals within a plurality of time units. Certainly, an advantage of sending a synchronization signal within the plurality of time units of a same frame is facilitating fast access. Therefore, in specific implementation, this depends on different requirements. When the plurality of groups of synchronization signals are sent, only a clear distinction between groups is required, for example, different frequency offset manners or different sequence combinations are required. This is not limited herein. Further, more system information may be transmitted by transmitting the synchronization signal within different time units in different frequency offset manners. This is not limited herein, either.

According to the synchronization processing method provided in this application, symbol timing information of a multi-beam access signal is identified by using an offset between synchronization signals in frequency domain or sequences in the synchronization signals, to avoid introducing a new synchronization signal or increasing signaling overheads of a broadcast channel, thereby effectively reducing resource overheads, and reducing detection complexity.

Figure 7:
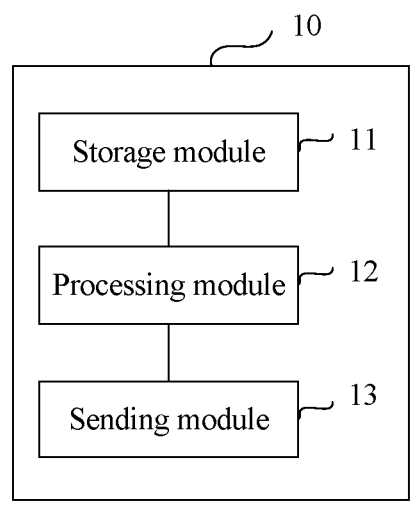
FIG. 7 is a schematic structural diagram of Embodiment 1 of a synchronization processing apparatus in this application.

FIG. 7 is a schematic structural diagram of Embodiment 1 of a synchronization processing apparatus in this application. The synchronization processing apparatus 10 includes:

a storage module 11, configured to: store a correspondence between a beam and a frequency offset, and store a corresponding program;

a processing module 12, configured to generate a first synchronization signal and a second synchronization signal; and a sending module 13, configured to send the first synchronization signal and the second synchronization signal to a terminal device within a first time unit, so that the terminal device determines an optimal transmit beam of the synchronization processing apparatus 10 for the terminal device and a time sequence of the optimal transmit beam based on the first synchronization signal and the second synchronization signal.

Sending frequencies of first synchronization signals in all beams are the same, each beam is corresponding to a different frequency offset, and the frequency offset is a difference between the frequency of the first synchronization signal in the beam and a frequency of the second synchronization signal in the beam.

The synchronization processing apparatus provided in this embodiment is configured to perform the technical solution of the network device side in any one of the foregoing method embodiments. An implementation principle and a technical effect of the node fault detection apparatus are similar to those of the node fault detection method, and details are not described herein again.

Based on the foregoing embodiment, optionally, first synchronization signals in all beams use a same sequence.

Optionally, the second synchronization signal in all beams use a same sequence.

Optionally, the sending module 13 is further configured to send a third synchronization signal and a fourth synchronization signal to the terminal device within a second time unit, so that the terminal device determines an optimal transmit beam of the synchronization processing apparatus for the terminal device and a time sequence of the optimal transmit beam based on the first synchronization signal, the second synchronization signal, the third synchronization signal, and the fourth synchronization signal.

Sending frequencies of third synchronization signals in all beams are the same, and each beam has a different difference between the frequency of the third synchronization signal and a frequency of the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

The synchronization processing apparatus provided in the foregoing solution is configured to perform the technical solution of the network device side in any one of the foregoing method embodiments. An implementation principle and a technical effect of the node fault detection apparatus are similar to those of the node fault detection method, and details are not described herein again.

Figure 8:
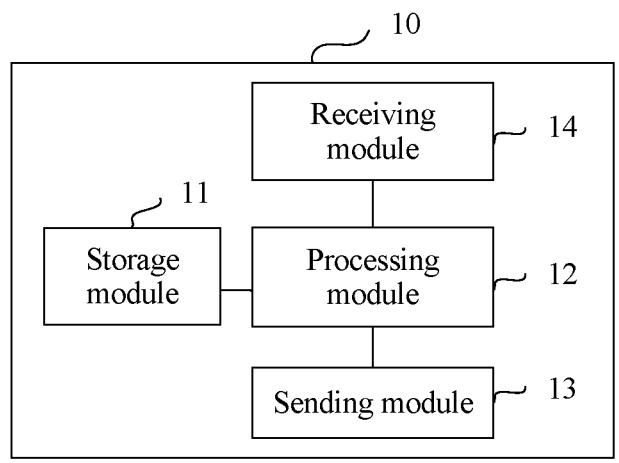
FIG. 8 is a schematic structural diagram of Embodiment 2 of a synchronization processing apparatus in this application.

FIG. 8 is a schematic structural diagram of Embodiment 2 of a synchronization processing apparatus in this application. As shown in FIG. 8, based on the foregoing embodiment, the synchronization processing apparatus 10 further includes:

a receiving module 14, configured to receive a signal sent by the terminal device in the time sequence of the optimal transmit beam.

The synchronization processing apparatus provided in this embodiment is configured to perform the technical solution of the network device side in any one of the foregoing method embodiments. An implementation principle and a technical effect of the node fault detection apparatus are similar to those of the node fault detection method, and details are not described herein again.

Figure 9:
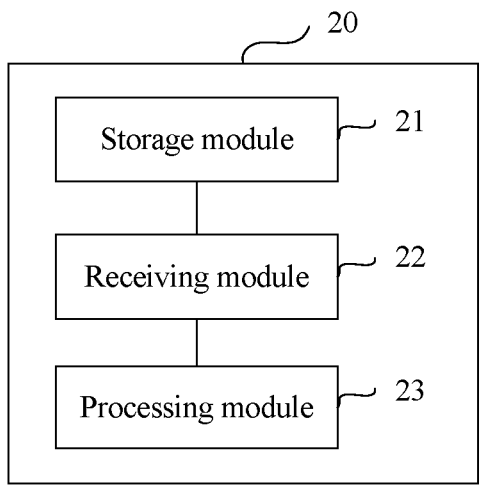
FIG. 9 is a schematic structural diagram of Embodiment 3 of a synchronization processing apparatus in this application.

FIG. 9 is a schematic structural diagram of Embodiment 3 of a synchronization processing apparatus in this application. As shown in FIG. 9, the synchronization processing apparatus 20 includes:

a storage module 21, configured to: store a correspondence between a beam and a frequency offset, and store a corresponding program;

a receiving module 22, configured to receive a first synchronization signal and a second synchronization signal that are sent by a network device within a first time unit, where sending frequencies of first synchronization signals in all beams are the same, each beam is corresponding to a different frequency offset, and the frequency offset is a difference between the frequency of the first synchronization signal in the beam and a frequency of the second synchronization signal in the beam; and a processing module 23, configured to determine an optimal transmit beam of the network device for the synchronization processing apparatus and a time sequence of the optimal transmit beam based on the first synchronization signal and the second synchronization signal.

The synchronization processing apparatus provided in this embodiment is configured to perform the technical solution of the terminal device side in any one of the foregoing method embodiments. An implementation principle and a technical effect of the node fault detection apparatus are similar to those of the node fault detection method, and details are not described herein again.

Based on Embodiment 3, the processing module 23 is specifically configured to:

perform correlation detection between each beam sequence used by the first synchronization signal and a first synchronization sequence stored in the storage module 21 or generated on line, perform correlation detection between each beam sequence used by the second synchronization signal and a second synchronization sequence stored in the storage module 21 or generated on line, and obtain an optimal beam of the first synchronization signal and an optimal beam of the second synchronization signal, where the optimal beam is a beam with correlation higher than a preset threshold and with highest correlation; and obtain the optimal transmit beam of the network device for the synchronization processing apparatus 20 and the time sequence of the optimal transmit beam based on a frequency difference between a frequency of the optimal beam of the first synchronization signal and a frequency of the optimal beam of the second synchronization signal.

Optionally, first synchronization signals in all beams use a same sequence.

Optionally, the second synchronization signal in all beams use a same sequence.

Optionally, the receiving module 22 is further configured to receive a third synchronization signal and a fourth synchronization signal that are sent by the network device within a second time unit. Sending frequencies of third synchronization signals in all beams are the same, and each beam has a different difference between the frequency of the third synchronization signal and a frequency of the fourth synchronization signal.

The processing module 23 is specifically configured to determine an optimal transmit beam of the network device for the synchronization processing apparatus and a time sequence of the optimal transmit beam based on the first synchronization signal and the second synchronization signal, or based on the third synchronization signal and the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, the processing module 23 is further configured to initiate random access based on a time sequence correspondence between the optimal transmit beam and a random access channel.

The synchronization processing apparatus provided in this embodiment is configured to perform the technical solution of the terminal device side in any one of the foregoing method embodiments. An implementation principle and a technical effect of the node fault detection apparatus are similar to those of the node fault detection method, and details are not described herein again.

Figure 10:
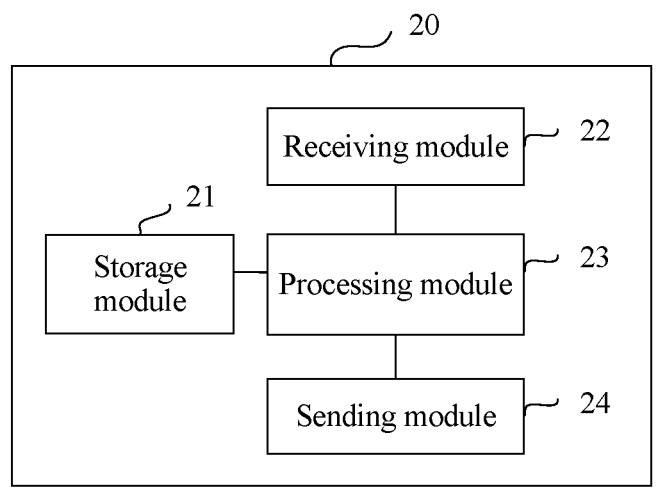
FIG. 10 is a schematic structural diagram of Embodiment 4 of a synchronization processing apparatus in this application.

FIG. 10 is a schematic structural diagram of Embodiment 4 of a synchronization processing apparatus in this application. The synchronization processing apparatus 20 further includes:

a sending module 24, configured to send a signal to the network device in the time sequence of the optimal transmit beam.

The synchronization processing apparatus provided in this embodiment is configured to perform the technical solution of the terminal device side in any one of the foregoing method embodiments. An implementation principle and a technical effect of the node fault detection apparatus are similar to those of the node fault detection method, and details are not described herein again.

Figure 11:
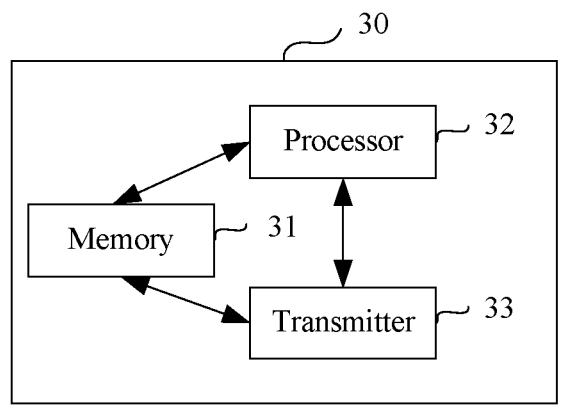
FIG. 11 is a schematic structural diagram of Embodiment 1 of a network device in this application.

FIG. 11 is a schematic structural diagram of Embodiment 1 of a network device in this application. As shown in FIG. 11, the network device 30 includes:

a memory 31, configured to: store a correspondence between a beam and a frequency offset, and store a corresponding program;

a processor 32, configured to generate a first synchronization signal and a second synchronization signal; and a transmitter 33, configured to send the first synchronization signal and the second synchronization signal to a terminal device within a first time unit, so that the terminal device determines an optimal transmit beam of the network device for the terminal device and a time sequence of the optimal transmit beam based on the first synchronization signal and the second synchronization signal, where sending frequencies of first synchronization signals in all beams are the same, each beam is corresponding to a different frequency offset, and the frequency offset is a difference between the frequency of the first synchronization signal in the beam and a frequency of the second synchronization signal in the beam.

The network device provided in this embodiment is configured to perform the technical solution of the network device side in any one of the foregoing method embodiments. An implementation principle and a technical effect of the network device are similar to those of the node fault detection method, and details are not described herein again.

Based on Embodiment 1 of the network device, first synchronization signals in all beams use a same sequence, and the second synchronization signal in all beams use a same sequence.

Optionally, first synchronization signals in all the beams use the same sequence.

Optionally, the second synchronization signal in all the beams use the same sequence.

Optionally, the transmitter 33 is further configured to send a third synchronization signal and a fourth synchronization signal to the terminal device within a second time unit, so that the terminal device determines an optimal transmit beam of the network device for the terminal device and a time sequence of the optimal transmit beam based on the first synchronization signal and the second synchronization signal, or based on the third synchronization signal and the fourth synchronization signal.

Sending frequencies of third synchronization signals in all beams are the same, and each beam has a different difference between the frequency of the third synchronization signal and a frequency of the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Figure 12:
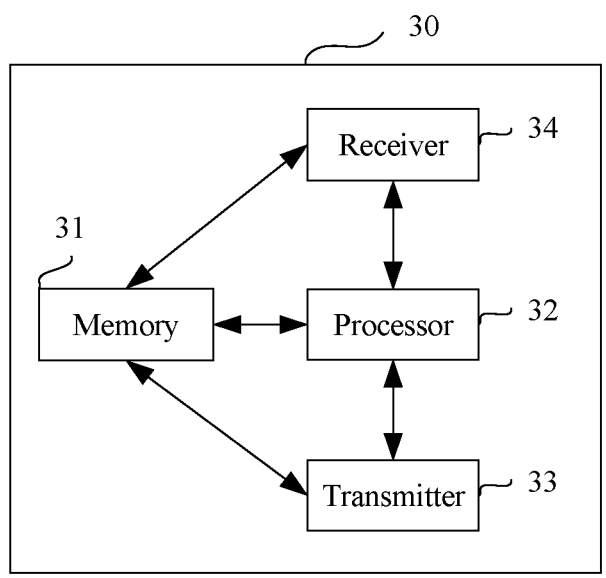
FIG. 12 is a schematic structural diagram of Embodiment 2 of a network device in this application.

FIG. 12 is a schematic structural diagram of Embodiment 2 of a network device in this application. As shown in FIG. 12, the network device 30 further includes:

a receiver 34, configured to receive a signal sent by the terminal device in the time sequence of the optimal transmit beam.

The network device provided in this embodiment is configured to perform the technical solution of the network device side in any one of the foregoing method embodiments. An implementation principle and a technical effect of the network device are similar to those of the node fault detection method, and details are not described herein again.

Figure 13:
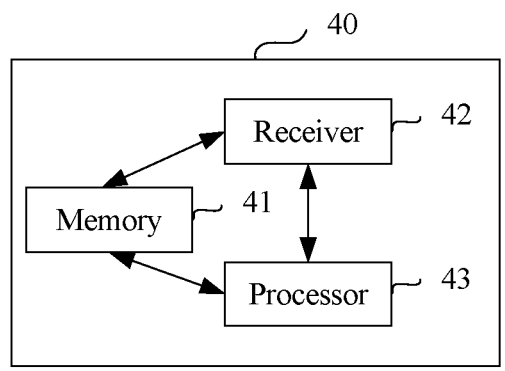
FIG. 13 is a schematic structural diagram of Embodiment 1 of a terminal device in this application.

FIG. 13 is a schematic structural diagram of Embodiment 1 of a terminal device in this application. As shown in FIG. 13, the terminal device 40 includes:

a memory 41, configured to: store a correspondence between a beam and a frequency offset, and store a corresponding program;

a receiver 42, configured to receive a first synchronization signal and a second synchronization signal that are sent by a network device within a first time unit, where sending frequencies of first synchronization signals in all beams are the same, each beam is corresponding to a different frequency offset, and the frequency offset is a difference between the frequency of the first synchronization signal in the beam and a frequency of the second synchronization signal in the beam; and a processor 43, configured to determine an optimal transmit beam of the network device for the terminal device and a time sequence of the optimal transmit beam based on the first synchronization signal and the second synchronization signal.

The terminal device provided in this embodiment is configured to perform the technical solution of the terminal device side in any one of the foregoing method embodiments. An implementation principle and a technical effect of the terminal device are similar to those of the node fault detection method, and details are not described herein again.

Based on Embodiment 1 of the terminal device, the processor 43 is specifically configured to:

perform correlation detection between each beam sequence used by the first synchronization signal and a first synchronization sequence stored in the memory 41 or generated on line, perform correlation detection between each beam sequence used by the second synchronization signal and a second synchronization sequence stored in the memory 41 or generated on line, and obtain an optimal beam of the first synchronization signal and an optimal beam of the second synchronization signal, where the optimal beam is a beam with correlation higher than a preset threshold and with highest correlation; and obtain the optimal transmit beam used for the user equipment by the network device and the time sequence of the optimal transmit beam based on a frequency difference between a frequency of the optimal beam of the first synchronization signal and a frequency of the optimal beam of the second synchronization signal.

Optionally, first synchronization signals in all beams use a same sequence.

Optionally, the second synchronization signal in all beams use a same sequence.

Optionally, the receiver 42 is further configured to receive a third synchronization signal and a fourth synchronization signal that are sent by the network device within a second time unit. Sending frequencies of third synchronization signals in all beams are the same, and each beam has a different difference between the frequency of the third synchronization signal and a frequency of the fourth synchronization signal.

The processor 43 is specifically configured to determine an optimal transmit beam used for the user equipment by the network device and a time sequence of the optimal transmit beam based on the first synchronization signal and the second synchronization signal, or based on the third synchronization signal and the fourth synchronization signal.

Optionally, the third synchronization signal in all beams use a same sequence.

Optionally, the fourth synchronization signal in all beams use a same sequence.

Optionally, when the second synchronization signal in all the beams use the same sequence, and the fourth synchronization signal in all the beams use the same sequence, a sequence used by the second synchronization signal and a sequence used by the fourth synchronization signal are orthogonal to each other.

Optionally, a sequence used by the second synchronization signal and a sequence used by the fourth synchronization signal are conjugate to each other.

Optionally, when first synchronization signals in all the beams use the same sequence, and the third synchronization signal in all the beams use the same sequence, a sequence used by the first synchronization signal and a sequence used by the third synchronization signal are orthogonal to each other.

Further, optionally, a sequence used by the first synchronization signal and a sequence used by the third synchronization signal are conjugate to each other.

Optionally, a sequence used by each beam in the first synchronization signal is the same as a sequence used by each beam in the third synchronization signal, and a sequence used by each beam in the second synchronization signal is the same as a sequence used by each beam in the fourth synchronization signal.

Optionally, the processor 43 is further configured to initiate random access based on a time sequence correspondence between the optimal transmit beam and a random access channel.

The terminal device provided in this embodiment is configured to perform the technical solution of the terminal device side in any one of the foregoing method embodiments. An implementation principle and a technical effect of the terminal device are similar to those of the node fault detection method, and details are not described herein again.

Figure 14:
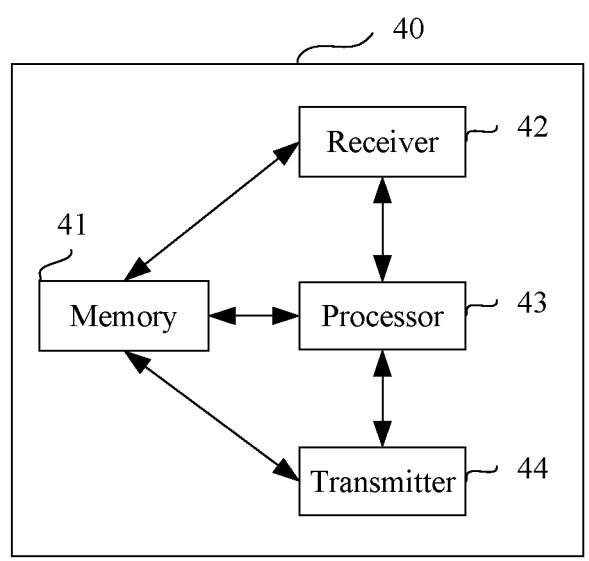
FIG. 14 is a schematic structural diagram of Embodiment 2 of a terminal device in this application.

FIG. 14 is a schematic structural diagram of Embodiment 2 of a terminal device in this application. As shown in FIG. 14, based on the foregoing embodiment, the terminal device 40 further includes:

a transmitter 44, configured to send a signal to the network device in the time sequence of the optimal transmit beam.

The terminal device provided in this embodiment is configured to perform the technical solution of the terminal device side in any one of the foregoing method embodiments. An implementation principle and a technical effect of the terminal device are similar to those of the node fault detection method, and details are not described herein again.

This application further provides a storage medium, including a readable storage medium and a computer program. The computer program is used to implement the technical solution of the network device in the synchronization processing method provided in any one of the foregoing implementations.

This application further provides a storage medium, including a readable storage medium and a computer program. The computer program is used to implement the technical solution of the terminal device in the synchronization processing method provided in any one of the foregoing implementations.

This application further provides a program product, including a computer program. The computer program is stored in a readable storage medium, and at least one processor of a network device reads the computer program from the readable storage medium and executes the computer program, so that the network device implements the technical solution of the synchronization processing method provided in any one of the foregoing solutions.

This application further provides a program product, including a computer program. The computer program is stored in a readable storage medium, and at least one processor of a terminal device reads the computer program from the readable storage medium and executes the computer program, so that the terminal device implements the technical solution of the synchronization processing method provided in any one of the foregoing embodiments.

It should be understood that in the foregoing network device and terminal device embodiments, the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the method disclosed with reference to the embodiments of this application may be directly performed by a hardware processor, or may be performed by using a combination of hardware in the processor and a software module.

A person of ordinary skill in the art may understand that all or some of the steps of the method embodiments may be implemented by a program instructing related hardware. The program may be stored in a computer-readable memory. When the program is executed, the steps of the methods in the embodiments are performed. The memory (storage medium) includes a read-only memory (ROM), a RAM, a flash memory, a hard disk, a solid-state disk, a magnetic tape, a floppy disk, an optical disc, and any combination thereof.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A synchronization processing method, comprising:
sending, by a network device to a terminal device, a first plurality of beams within a first time unit, wherein:

each beam of the first plurality of beams comprises a first synchronization signal at a first frequency and a second synchronization signal at a second frequency;
respective frequency offsets for the first plurality of beams are different, each frequency offset being a difference between the first frequency of the first synchronization signal of a corresponding beam of the first plurality of beams and the second frequency of the second synchronization signal of the corresponding beam; and
first frequencies of the first synchronization signals of the first plurality of beams are equivalent to each other; and
receiving, by the network device from the terminal device, an uplink signal using a first transmit beam, the first transmit beam and a first time sequence of the first transmit beam being based on the first plurality of beams.

2. The method according to claim 1, wherein:
the first synchronization signals of the first plurality of beams comprise a same first sequence; or
the second synchronization signals of the first plurality of beams comprise a same second sequence.

3. The method according to claim 1, further comprising:
sending, by the network device to the terminal device, a second plurality of beams within a second time unit for determining a second transmit beam and a second time sequence of the second transmit beam, wherein:
each beam of the second plurality of beams comprises a third synchronization signal at a third frequency and a fourth synchronization signal at a fourth frequency;
respective frequency offsets for the second plurality of beams are different, each frequency offset being a difference between the third frequency of the third synchronization signal of a corresponding beam of the second plurality of beams and the fourth frequency of the fourth synchronization signal of the corresponding beam; and
third frequencies of the third synchronization signals of the second plurality of beams are equivalent to each other.

4. The method according to claim 3, wherein:
the third synchronization signals of the second plurality of beams comprise a same third sequence; or
the fourth synchronization signals of the second plurality of beams comprise a same fourth sequence.

5. The method according to claim 4 wherein:
the second synchronization signals of the first plurality of beams comprise a same second sequence;
the fourth synchronization signals of the second plurality of beams comprise the fourth sequence; and
wherein the second sequence and the fourth sequence are orthogonal to each other.

6. A synchronization processing method, comprising:
receiving, by a terminal device from a network device, a first plurality of beams within a first time unit wherein:
each beam of the first plurality of beams comprises a first synchronization signal at a first frequency and a second synchronization signal at a second frequency;
respective frequency offsets for the first plurality of beams are different, each frequency offset being a difference between the first frequency of the first synchronization signal of a corresponding beam of the first plurality of beams and the second frequency of the second synchronization signal of the corresponding beam; and first frequencies of the first synchronization signals of the first plurality of beams are equivalent to each other; and
determining, by the terminal device, a first transmit beam of the network device for the terminal device and a first time sequence of the first transmit beam based on at least one first synchronization signal and at least one corresponding second synchronization signal of the first plurality of beams.

7. The method according to claim 6, wherein determining the first transmit beam and the first time sequence of the first transmit beam comprises:
performing, by the terminal device, correlation detection between each first beam sequence used by each corresponding first synchronization signal of the first plurality of beams and a first synchronization sequence;
performing, by the terminal device, correlation detection between each second beam sequence used by each corresponding second synchronization signal of the first plurality of beams and a second synchronization sequence;
obtaining, by the terminal device, a first optimal beam of the first synchronization signals of the first plurality of beams, wherein the first optimal beam corresponds to a first correlation result that exceeds a preset threshold, and wherein the first correlation result exceeds or equals remaining correlation results of the first synchronization signals of the first plurality of beams;
obtaining, by the terminal device, a second optimal beam of the second synchronization signals of the first plurality of beams, wherein the second optimal beam corresponds to a second correlation result that exceeds the preset threshold, and wherein the second correlation result exceeds or equals remaining correlation results of the second synchronization signals of the first plurality of beams; and
determining, by the terminal device, the first transmit beam of the network device for the terminal device and the first time sequence of the first transmit beam based on a frequency difference between a frequency of the first optimal beam of the first synchronization signal and a frequency of the second optimal beam of the second synchronization signal.

8. The method according to claim 6, wherein:
the first synchronization signals of the first plurality of beams comprise a same first sequence; or
the second synchronization signals of the first plurality of beams comprise a same second sequence.

9. The method according to claim 6, further comprising:
receiving, by the terminal device from the network device, a second plurality of beams within a second time unit, wherein:
each beam of the second plurality of beams comprises a third synchronization signal at a third frequency and a fourth synchronization signal at a fourth frequency;
respective frequency offsets for the second plurality of beams different, each frequency offset being a difference between the third frequency of the third synchronization signal of a corresponding beam of the second plurality of beams and the fourth frequency of the fourth synchronization signal of the corresponding beam; and
third frequencies of the third synchronization signals of the second plurality of beams are equivalent to each other; and determining, by the terminal device, the first transmit beam of the network device for the terminal device and the first time sequence of the first transmit beam based further on at least one third synchronization signal and at least one corresponding fourth synchronization signal of the second plurality of beams.

10. The method according to claim 9, wherein:
the second synchronization signals of the first plurality of beams comprise a same second sequence;
the fourth synchronization signals of the second plurality of beams comprise a same fourth sequence; and
wherein the second sequence and the fourth sequence are orthogonal to each other.

11. A network device, comprising:
a processor configured to generate a first synchronization signal and a second synchronization signal; and
a transmitter configured to send a first plurality of beams within a first time unit to a terminal device for determining a first transmit beam and a first time sequence of the first transmit beam, wherein:
  each beam of the first plurality of beams comprises the first synchronization signal at a first frequency and the second synchronization signal at a second frequency;
  respective frequency offsets for the first plurality of beams are different, each frequency offset being a difference between the first frequency of the first synchronization signal of a corresponding beam of the first plurality of beams and the second frequency of the second synchronization signal of the corresponding beam; and
  first frequencies of the first synchronization signals of the first plurality of beams are equivalent to each other.

12. The network device according to claim 11, wherein:
the first synchronization signals of the first plurality of beams comprise a same first sequence; or
the second synchronization signals of the first plurality of beams comprise a same second sequence.

13. The network device according to claim 11, wherein the transmitter is further configured to:
send a second plurality of beams within a second time unit to the terminal device for determining a second transmit beam and a second time sequence of the second transmit beam, wherein:
  each beam of the second plurality of beams comprises a third synchronization signal at a third frequency and a fourth synchronization signal at a fourth frequency;
  respective frequency offsets for the second plurality of beams are different, each frequency offset being a difference between the third frequency of the third synchronization signal of a corresponding beam of the second plurality of beams and the fourth frequency of the fourth synchronization signal of the corresponding beam; and
  third frequencies of the third synchronization signals of the second plurality of beams are equivalent to each other.

14. The network device according to claim 13, wherein:
the third synchronization signals of the second plurality of beams comprise a same third sequence; or
the fourth synchronization signals of the second plurality of beams comprise a same fourth sequence.

15. The network device according to claim 14, wherein:
the second synchronization signals of the first plurality of beams comprise a same second sequence;
the fourth synchronization signals of the second plurality of beams comprise the fourth sequence; and
wherein the second sequence and the fourth sequence are orthogonal to each other.

16. A terminal device, comprising:
a receiver configured to receive, from a network device, a first plurality of beams within a first time, wherein:
  each beam of the first plurality of beams comprises a first synchronization signal at a first frequency and a second synchronization signal at a second frequency;
  respective frequency offsets for the first plurality of beams are different, each frequency offset being a difference between the first frequency of the first synchronization signal of a corresponding beam of the first plurality of beams and the second frequency of the second synchronization signal of the corresponding beam; and
  first frequencies of the first synchronization signals of the first plurality of beams are equivalent to each other; and
a processor configured to determine a first transmit beam of the network device for the terminal device and a first time sequence of the first transmit beam based on at least one first synchronization signal and at least one corresponding second synchronization signal of the first plurality of beams.

17. The terminal device according to claim 16, wherein the processor is further configured to:
perform correlation detection between each first beam sequence used by each corresponding first synchronization signal of the first plurality of beams and a first synchronization sequence;
perform correlation detection between each second beam sequence used by each corresponding second synchronization signal of the first plurality of beams and a second synchronization sequence;
obtain a first optimal beam of the first synchronization signals of the first plurality of beams, wherein the first optimal beam corresponds to a first correlation result that exceeds a preset threshold, and wherein the first correlation result exceeds or equals remaining correlation results of the first synchronization signals of the first plurality of beams;
obtain a second optimal beam of the second synchronization signals of the first plurality of beams, wherein the second optimal beam corresponds to a second correlation result that exceeds the preset threshold, and wherein the second correlation result exceeds or equals remaining correlation results of the second synchronization signals of the first plurality of beams; and
obtain the first transmit beam of the network device for the terminal device and the first time sequence of the first transmit beam based on a frequency difference between a frequency of the first optimal beam of the first synchronization signal and a frequency of the second optimal beam of the second synchronization signal.

18. The terminal device according to claim 16, wherein:
the first synchronization signals of the first plurality of beams comprise a same first sequence; or
the second synchronization signals of the first plurality of beams comprise a same second sequence.

19. The terminal device according to claim 16, wherein:
the receiver is further configured to receive a second plurality of beams within a second time unit from the network device, wherein:

each beam of the second plurality of beams comprises a third synchronization signal at a third frequency and a fourth synchronization signal at a fourth frequency;

respective frequency offsets for the second plurality of beams are different, each frequency offset being a difference between the third frequency of the third synchronization signal of a corresponding beam of the second plurality of beams and the fourth frequency of the fourth synchronization signal of the corresponding beam; and third frequencies of the third synchronization signals of the second plurality of beams are equivalent to each other; and the processor is further configured to determine the first transmit beam of the network device for the terminal device and the first time sequence of the first transmit beam based further on at least one third synchronization signal and at least one corresponding fourth synchronization signal of the second plurality of beams.

20. The terminal device according to claim 19, wherein:

the third synchronization signals of the second plurality of beams comprise a same third sequence; or the fourth synchronization signals of the second plurality of beams comprise a same fourth sequence.

* * * * *

UNITED STATES PATENT AND TRADEMARK OFFICE
CERTIFICATE OF CORRECTION

PATENT NO. : 10,887,855 B2  
APPLICATION NO. : 16/359601  
DATED : January 5, 2021  
INVENTOR(S) : Jin Liu et al.

Page 1 of 1

It is certified that error appears in the above-identified patent and that said Letters Patent is hereby corrected as shown below:

In the Claims

In Column 28, Line 59, Claim 9, delete "beams different" and insert --beams are different--.

In Column 30, Line 7, Claim 16, delete "first time, wherein:" and insert --first time unit, wherein:--.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*